A. P. SWAIDMARK.
HOSE CLAMP.
APPLICATION FILED MAY 19, 1916.

1,219,882. Patented Mar. 20, 1917.

WITNESSES
Frank C. Palmer
J. E. Larsen

INVENTOR
A. P. Swaidmark
BY Munn & Co.
ATTORNEYS

UNITED STATES PATENT OFFICE.

ALBIN P. SWAIDMARK, OF ORLANDO, FLORIDA.

HOSE-CLAMP.

1,219,882.   Specification of Letters Patent.   Patented Mar. 20, 1917.

Application filed May 19, 1916. Serial No. 98,587.

*To all whom it may concern:*

Be it known that I, ALBIN P. SWAIDMARK, a citizen of the United States, and a resident of Orlando, in the county of Orange and State of Florida, have invented certain new and useful Improvements in Hose-Clamps, of which the following is a specification.

My invention relates to hose clamps, and the main object thereof is to provide such clamps of universal adaptability in that they may be fitted to hose of any diameter, thereby permitting a supply house to meet all demands with a much smaller stock than is possible with the clamps now in use.

My invention is fully described in the following specification, of which the accompanying drawings form a part, in which like characters refer to like parts in each of the views, and in which:—

Figure 1:
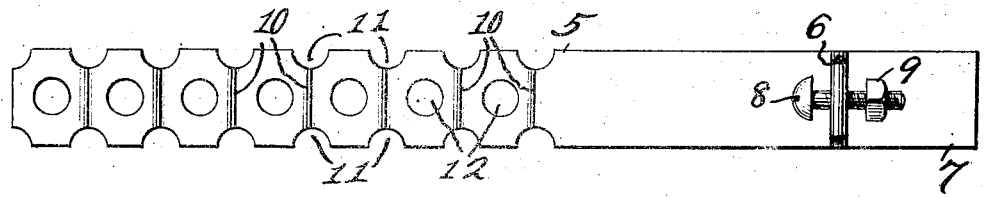
Figure 1 is an extended view of my clamp as vended.
Figure 2:
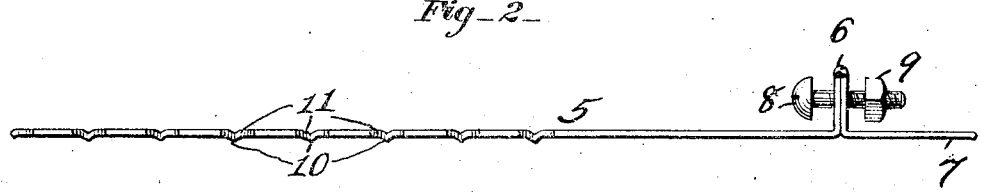
Fig. 2 is an edge view thereof.

Referring to the drawings, 5 represents a metal ribbon, as of steel, brass, or any suitable equivalent, bent into a perpendicular loop 6 adjacent one end 7 and which loop is drilled to form a bearing for a bolt 8 provided with a nut 9, the latter being in the direction of the end 7 of the ribbon.

The major portion of the ribbon 5 is transversely scored on equidistant lines, as shown at 10, and provided with recesses 11 at each edge in the positions of the several scorings, this being to weaken the ribbon at the scored lines so that any excess length of the ribbon may be easily broken off from the main portion as will be later explained, and the ribbon is also provided with a circular opening 12 midway between the lines of scorings and midway between the ribbon edges.

Figure 4:
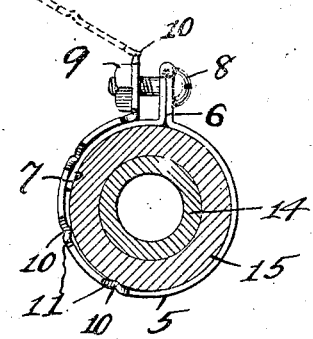
Fig. 4 is a section taken on the line 4—4 of Fig. 3.

In practice, the end 7 is curved around the hose to be clamped and the free end of said ribbon is then wrapped around the hose to overlie the end 7, as is clearly shown in Fig. 4, after which the ribbon is bent outwardly parallel to the loop 6 on the line of scorings nearest to said loop when the ribbon has been so wrapped around the hose.

Figure 3:
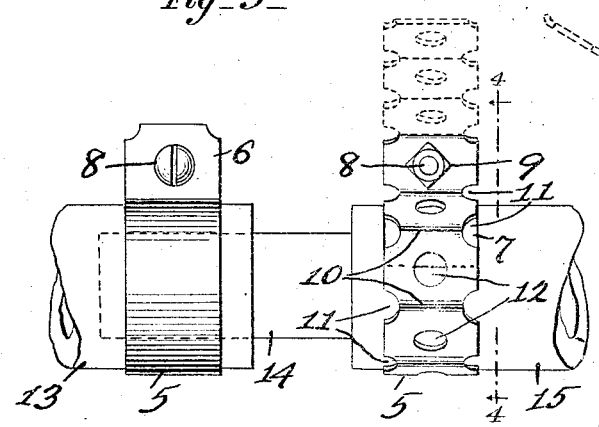
Fig. 3 is a view of two of my clamps, viewed from opposite sides, joining two hose lengths by means of a pipe section.

The bolt 8 is now passed through the respective hole 12 in line with the bore in the loop 6 and the nut 9 screwed on said bolt and, when said nut is tightened, the hose is firmly clamped to a pipe section or other element therein, after which the excess ribbon beyond the line of scoring next beyond the hole 12 through which the bolt passes may be broken away, as indicated by dotted lines in Figs. 3 and 4.

In Fig. 3 I have shown a hose section 13 clamped to a pipe section 14 upon the other end of which is clamped a hose section 15, this being merely to illustrate one manner of using my clamp, and it will be seen that the clamp is very easily and quickly attached, and that it is applicable to varying diameters of hose.

While I have described my invention as a hose clamp I do not limit myself to such use, nor do I desire to limit myself to the exact structure shown, my invention consisting primarily of a clamp adaptable to hose of greatly varying diameters, and particularly to a metal ribbon weakened at spaced points to permit the ready removal of excess ribbon after the clamp has been installed.

Having fully described my invention, what I claim as new, and desire to secure by Letters Patent, is:—

1. A hose clamp, comprising a ribbon wrapped around a hose, a perpendicular loop formed adjacent one end thereof, and a bolt seated in said loop, said ribbon being provided with spaced holes each of which is adapted to receive said bolt to adjust said ribbon to hose of varying diameters, and being weakened between said spaced holes to permit the removal of excess ribbon 2. As an article of manufacture, a ribbon having a perpendicular loop formed adjacent one end, and a bolt seated in said loop, said ribbon being provided with spaced holes at its other end, with scorings between said holes, and with edge recesses at the ends of each line of scoring.

ALBIN P. SWAIDMARK.